(12) United States Patent
Gupta et al.

(10) Patent No.: US 8,335,428 B2
(45) Date of Patent: *Dec. 18, 2012

(54) METHOD AND SYSTEM FOR PROTECTION SWITCHING

(75) Inventors: Surendra Gupta, Richardson, TX (US);
Vijay Khopade, Richardson, TX (US);
Raghu Rajan, Murphy, TX (US);
Manlio Marquez, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 382 days.

This patent is subject to a terminal disclaimer.

(21) Appl. No.: 12/686,596

(22) Filed: Jan. 13, 2010

(65) Prior Publication Data

US 2011/0097080 A1 Apr. 28, 2011

Related U.S. Application Data

(60) Provisional application No. 61/254,354, filed on Oct. 23, 2009, provisional application No. 61/254,364, filed on Oct. 23, 2009.

(51) Int. Cl.
*H04B 10/00* (2006.01)
(52) U.S. Cl. .................................. 398/5; 398/12; 398/19
(58) Field of Classification Search ................ 398/5, 10, 398/12, 17, 19, 33–34
See application file for complete search history.

(56) References Cited

U.S. PATENT DOCUMENTS

| 5,790,491 A * | 8/1998 | Jaquette et al. ............ 369/47.53 |
| 6,411,751 B1 * | 6/2002 | Giles et al. ...................... 385/16 |
| 2002/0141009 A1 * | 10/2002 | Yu et al. ........................ 359/110 |
| 2006/0022815 A1 * | 2/2006 | Fischer et al. ................ 340/505 |
| 2006/0170565 A1 * | 8/2006 | Husak et al. ............. 340/825.49 |
| 2008/0175587 A1 * | 7/2008 | Jensen .............................. 398/2 |

OTHER PUBLICATIONS

U.S. Appl. No. 12/686,611; "Method and System for Protection Switching"; pp. 28, Jan. 13, 2010.

* cited by examiner

*Primary Examiner* — Dzung Tran
(74) *Attorney, Agent, or Firm* — Baker Botts L.L.P.

(57) ABSTRACT

A method is provided for protection switching in an optical network. The method may include establishing a baseline power level for a channel. The method may further include receiving a signal associated with the channel via each of a first path of the optical network and a second path of the optical network. The method may also include monitoring a power intensity of the signal received via the first path. The method may additionally include protection switching from the signal received via the first path to the signal received via the second path in response to a determination that the baseline power level exceeds the power intensity of the signal received via the first path by a predetermined threshold.

20 Claims, 5 Drawing Sheets

METHOD AND SYSTEM FOR PROTECTION SWITCHING

RELATED APPLICATIONS

This application claims the benefit of U.S. provisional application No. 61/254,354 entitled "Baseline-Based Optical Signal Error Detection" filed Oct. 23, 2009, the contents of which is hereby incorporated by reference in its entirety.

This application also claims the benefit of U.S. provisional application No. 61/254,364 entitled "Elastic Baseline-Based Optical Signal Error Detection" filed Oct. 23, 2009, the contents of which is hereby incorporated by reference in its entirety.

This application is related to copending Patent Application entitled "Method and System for Protection Switching," application Ser. No. 12/686,611, filed on the same date as the present application.

TECHNICAL FIELD OF THE INVENTION

The present invention relates generally to optical networks and, more particularly, to a method and system for protection switching in an optical system.

BACKGROUND

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of communicating the signals over long distances with very low loss. Optical networks often employ redundancies to maximize performance and availability. Such redundancies may include optical unidirectional path switched ring (OUPSR). With OUPSR, an optical signal may be transmitted via two or more optical paths between the same source and destination node. An OUPSR device at the destination may include a photodetector per each path to monitor signals received from the two or more paths. Based on such received signals, the OUPSR device may select one of the signals to be forwarded to a transponder or receiver at the destination node. For example, the OUPSR may determine, based on the photodetector monitoring, whether one of the paths has experienced a loss of signal or "loss of light." If a particular path experiences a loss of light, then the OUPSR may select another path to forward to the transponder or receiver. Such selection may be referred to as a "protection switch."

In order to accurately detect loss of light, photodetectors must often be of high quality and carefully calibrated. Such calibration adds complexity, time, and cost to the manufacturing process. If high-quality and carefully-calibrated photodetectors are not used, noise introduced into an optical system may cause operational problems in OUPSR. For example, amplified spontaneous emission (ASE) noise may be introduced into an optical network. In certain cases, ASE may further increase in networks including cascaded intermediate line amplifiers (ILAs). In the presence of noise, an OUPSR photodetector may detect light induced by noise even if a failure exists in a particular path, and thus, may not initiate a protection switch. Thus, OUSPR photodetectors must be extremely accurate in order to differentiate between noise and actual signal power.

SUMMARY

In accordance with a particular embodiment of the present disclosure, a method is provided for protection switching in an optical network. The method may include establishing a baseline power level for a channel. The method may further include receiving a signal associated with the channel via each of a first path of the optical network and a second path of the optical network. The method may also include monitoring a power intensity of the signal received via the first path. The method may additionally include protection switching from the signal received via the first path to the signal received via the second path in response to a determination that the baseline power level exceeds the power intensity of the signal received via the first path by a predetermined threshold.

Technical advantages of one or more embodiments of the present invention may provide methods and systems for calibrating a baseline power level in connection with a protection switching device, and establishing a threshold in connection with such baseline power level such that the expected noise in an optical network path is substantially less than a relative loss of light power level equal to the calibrated baseline power level minus the established threshold. Accordingly, a measurement of intensity of a signal received via the path at a power level below the relative loss of light power level may indicate a "true" loss of signal, despite the presence of noise with an intensity that may otherwise indicate a valid signal.

Embodiments of the present invention may thus allow for an economically efficient protection switching system that may not require high-quality and carefully-calibrated photodetectors to correctly account for noise.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
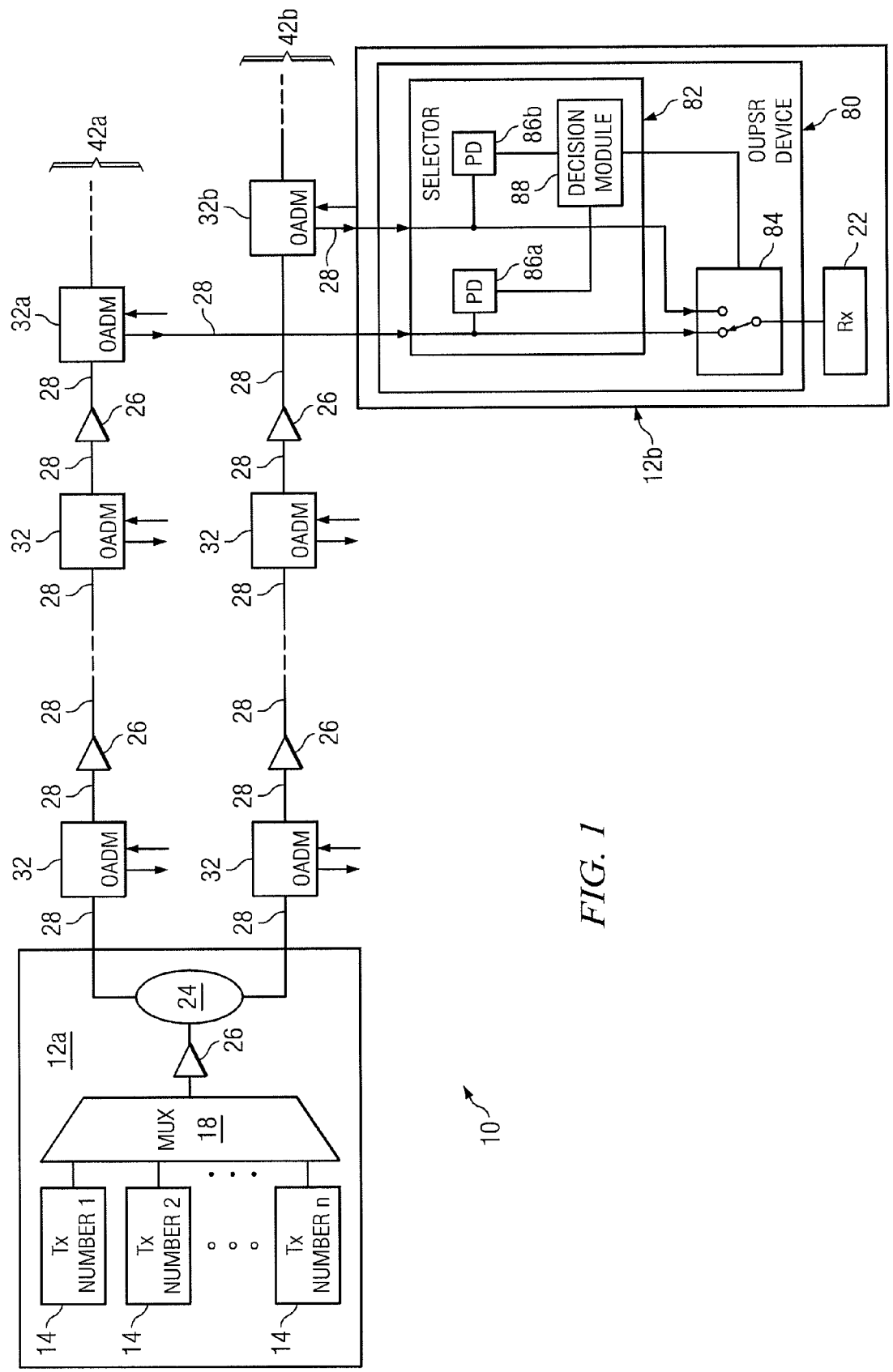
FIG. 1 is a block diagram illustrating an example optical network, in accordance with certain embodiments of the present disclosure.

FIG. 1 illustrates an example optical network 10. Optical network 10 may include one or more optical fibers 28 operable to transport one or more optical signals communicated by components of the optical network 10. The components of optical network 10, coupled together by optical fiber 28, may include nodes 12a and 12b and one or more optical add/drop multiplexers (OADMs) 32. Although the optical network 10 is shown as a point-to-point optical network with terminal nodes, the optical network 10 may also be configured as a ring optical network, a mesh optical network, or any other suitable optical network or combination of optical networks, and may include any number of nodes intermediate to nodes 12a and 12b. The optical network 10 may be used in a short-haul metropolitan network, a long-haul inter-city network, or any other suitable network or combination of networks.

A node 12 and/or OADM 32 may represent a Label Switching Router (LSR). One or more label switched paths (LSPs) including a sequence of nodes 12 and OADMs 32 may be established for routing packets throughout optical network 10. For example, traffic may travel from source node 12a, through zero, one, or more intermediate OADMs 32, to destination node 12b.

Node 12a may include transmitters 14, a multiplexer 18, an amplifier 26, and a splitter 24. Transmitters 14 may include any transmitter or other suitable device operable to transmit optical signals. Each transmitter 14 may be configured to receive information transmit a modulated optical signal at a certain wavelength. In optical networking, a wavelength of light is also referred to as a channel. Each transmitter 14 may also be configured to transmit this optically encoded information on the associated wavelength. The multiplexer 18 may include any multiplexer or combination of multiplexers or other devices operable to combine different channels into one signal. Multiplexer 18 may be configured to receive and combine the disparate channels transmitted by transmitters 14 into an optical signal for communication along fibers 28.

Amplifier 26 of node 12a may be used to amplify the multi-channeled signal. Amplifier 26 may be positioned before and/or after certain lengths of fiber 28. Amplifier 26 may comprise an optical repeater that amplifies the optical signal. This amplification may be performed without opto-electrical or electro-optical conversion. In particular embodiments, amplifier 26 may comprise an optical fiber doped with a rare-earth element. When a signal passes through the fiber, external energy may be applied to excite the atoms of the doped portion of the optical fiber, which increases the intensity of the optical signal. As an example, amplifier 26 may comprise an erbium-doped fiber amplifier (EDFA). However, any other suitable amplifier 26 may be used.

Splitter 24 may represent an optical coupler or any other suitable optical component operable to split an optical signal into multiple copies of the optical signal and transmit the copies to other components within network 10. In the illustrated embodiment, splitter 24 may receive a signal from amplifier 26 of node 12a and split the received traffic into two copies. One copy may be transmitted via path 42a, while the other copy may be transmitted over 42b, in order to provide redundancy protection for the signal, as described in greater detail below.

The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, node 12a in optical network 10 may be configured to transmit and multiplex disparate channels using WDM, DWDM, or some other suitable multi-channel multiplexing technique, and to amplify the multi-channel signal.

As discussed above, the amount of information that can be transmitted over an optical network varies directly with the number of optical channels coded with information and multiplexed into one signal. Therefore, an optical signal employing WDM may carry more information than an optical signal carrying information over solely one channel. An optical signal employing DWDM may carry even more information.

After the multi-channel signal is transmitted from node 12a, the signal may travel over one or more paths 42 (e.g., paths 42a and 42b) to node 12b. Each path 42 may include one or more OADMs 32, one or more amplifiers 26, and one or more fibers 28 coupling such OADMs 32 and amplifiers 26.

An OADM 32 may include any multiplexer or combination of multiplexers or other devices operable to combine different channels into one signal. An OADM 32 may be operable to receive and combine the disparate channels transmitted across optical network 10 into an optical signal for communication along fibers 28. In addition, an OADMs 32 comprise an add/drop module, which may include any device or combination of devices operable to add and/or drop optical signals from fibers 28. An OADM 32 may be coupled to an amplifier 26 which may be used to amplify a WDM and/or DWDM signal as it travels through the optical network 10. After a signal passes through an OADM 32, the signal may travel along fibers 28 directly to a destination, or the signal may be passed through one or more additional OADMs 32 before reaching a destination.

Similar to amplifier 26 of node 12a, other amplifiers 26 or optical network 10 may be used to amplify the multi-channeled signal communicated by OADMs 32. Amplifiers 26 may be positioned before and/or after certain lengths of fiber 28. Amplifiers 26 may comprise an optical repeater that amplifies the optical signal. This amplification may be performed without opto-electrical or electro-optical conversion. In particular embodiments, amplifiers 26 may comprise an optical fiber doped with a rare-earth element. When a signal passes through the fiber, external energy may be applied to excite the atoms of the doped portion of the optical fiber, which increases the intensity of the optical signal. As an example, amplifiers 26 may comprise an erbium-doped fiber amplifier (EDFA). However, any other suitable amplifiers 26 may be used.

An optical fiber 28 may include, as appropriate, a single, unidirectional fiber; a single, bi-directional fiber; or a plurality of uni- or bi-directional fibers. Although this description focuses, for the sake of simplicity, on an embodiment of the optical network 10 that supports unidirectional traffic, the present invention further contemplates a bi-directional system that includes appropriately modified embodiments of the components described below to support the transmission of information in opposite directions along the optical network 10. Furthermore, as is discussed in more detail below, the fibers 28 may be high chromatic dispersion fibers (as an example only, standard single mode fiber (SSMF) or non-dispersion shifted fiber (NDSF)), low chromatic dispersion fibers (as an example only, non zero-dispersion-shifted fiber (NZ-DSF), such as E-LEAF fiber), or any other suitable fiber types.

Node 12b may be configured to receive signals transmitted over optical network 10. For example, as shown in FIG. 1, a portion of the multi-channel signal through path 42a may be dropped to node 12b by OADM 32a, and a portion of the multi-channel signal through path 42b may be dropped to node 12b by OADM 32b. Node 12b may include an OUPSR device 80 and a receiver 22. OUPSR device 80 may include a selector 82 and a switch 84. OUPSR device 80 may be configured to receive at least a portion of the multi-channel signal from each of path 42a and 42b and, on a channel-by-channel basis, selects which of the two signals to pass to receiver 82. Such selection may be made on any suitable criteria, including bit error rate and/or power levels of the individual signals.

OUPSR device 80 may include a selector 82 and a switch 84. Selector 82 may include a photodetector 86 (e.g., photodetectors 86a and 86b) associated with each path 42. A photodetector 86 may be any system, device or apparatus configured to detect an intensity of light and convert such detected intensity into an electrical signal indicative of such intensity. Such electrical signals from photodetectors 86 may be communicated to decision module 88. Based on analysis of the electrical signals from photodetectors 86, decision module 88 may determine, on a channel-by-channel basis, whether to pass the signal dropped from path 42a or the signal dropped from path 42b. A signal indicative of such determination may be communicated from decision module 88 to switch 84, and switch 84 may pass either the signal from path 42a or the signal from path 42b to receiver 22 based on the signal received from decision module 88. For example, decision module 88 may be configured such that the signal received from path 42a is passed to receiver 22 unless the intensity of signal received via path 42a falls below a particular threshold relative to a baseline power level (thus indicating a loss of light condition), in which case switch 84 may protection switch such that the signal received via path 42b is passed to receiver 22. In addition, as described in greater detail below with respect to FIGS. 2-5, decision module 88 may dynamically vary the baseline power level and threshold.

Receiver 22 may include any receiver or other suitable device operable to receive an optical signal. Receiver 22 may be configured to receive one or more channels of an optical signal carrying encoded information and demodulate the information into an electrical signal.

Figure 2A:
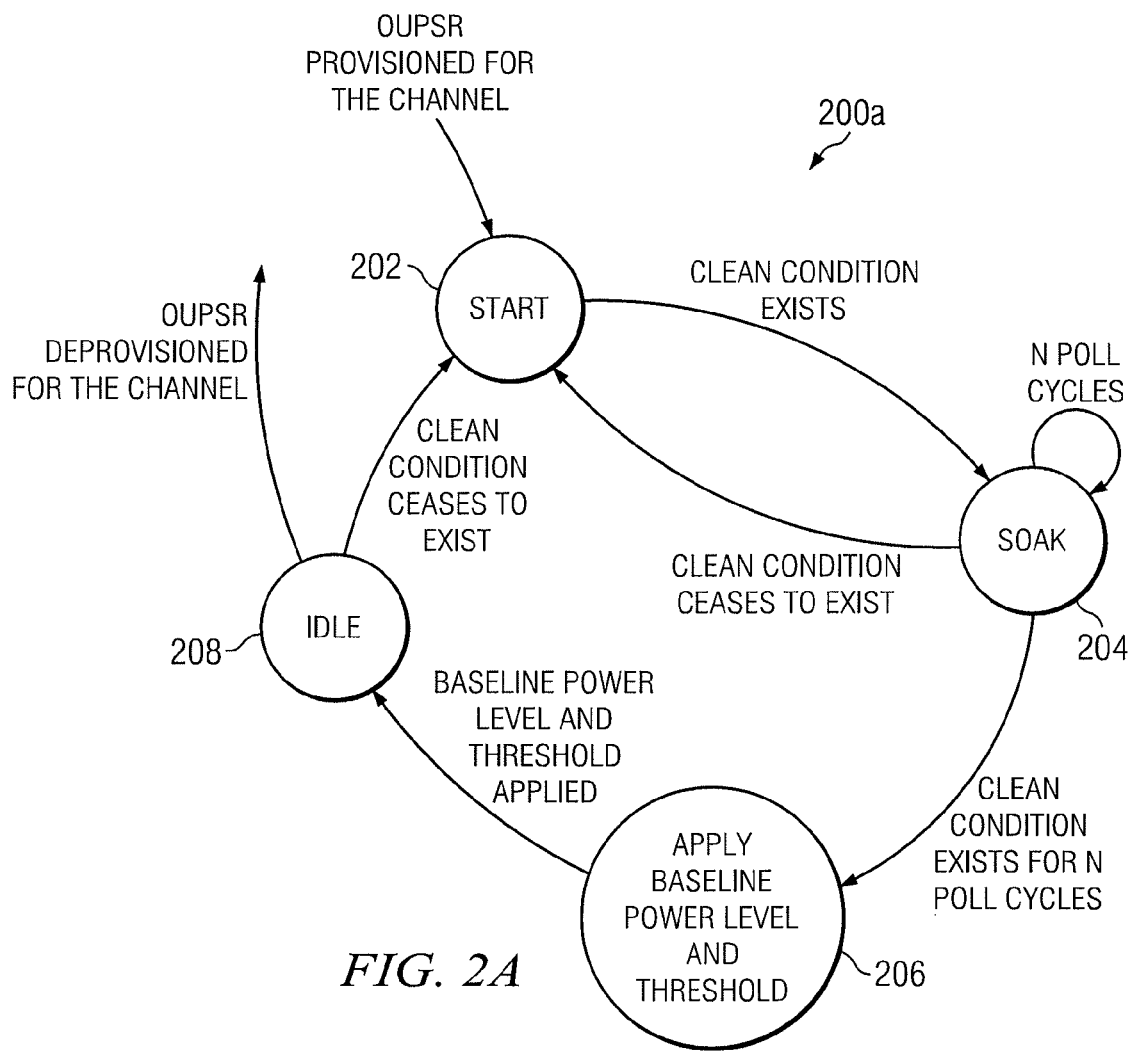
FIGS. 2A-2C are each flow charts illustrating a finite state machine in accordance with certain embodiments of the present disclosure.

FIG. 2A is a flow chart illustrating a finite state machine 200a in accordance with certain embodiments of the present disclosure. State machine 200a may be maintained by decision module 88, another component of OUPSR device 80, or any other suitable component of optical network 10. State machine 200a may begin at state 202 in response to a determination and/or instruction to provision OUPSR for a particular channel. If, while in state 202, OUPSR device determines that a "clean" condition exists with respect to the channel over one or more paths 42, state machine 200a may proceed to state 204. A clean condition may exist where one or more parameters associated with the particular channel indicate that communication via one or more of paths 42 is available. For example, a clean condition may exist when OUPSR device 80 is present, a signal is detected on the channel by OUPSR device 80, and Alarm Indication Signal-Optical (AIS-O)=0 and Unequipped/Unvprovisioned (UNEQ)=0 for all paths 42 coupled to OUPSR device 80.

At state 204 decision module 88, another component of OUPSR device 80, or any other suitable component of optical network 10 may continue to poll for the continued existence of the clean condition for a predetermined amount of time (e.g., 3 poll cycles of OUPSR device 80). If the clean condition exists for the predetermined amount of time, state machine 200a may proceed to state 206. If the clean condition fails to exist during the predetermined amount of time (e.g., OUPSR device 80 is removed, failure to detect signal on the channel by OUPSR device 80, AIS-0=1, and/or UNEQ=1), state machine 200a may again proceed to state 202.

At state 206, decision module 88, another component of OUPSR device 80, or any other suitable component of optical network 10 may apply and store an initial baseline power level and initial threshold for one or more of photodetectors 86. Thus, state 206 may be thought of as a self-calibration phase of OUPSR device 80. In some embodiments, the initial baseline power level may be approximately equal to the intensity of light detected by a photodetector 86 during state 204. In the same or alternative embodiments, the initial threshold may be equal to a predetermined value (e.g., 5 dBm). After the initial baseline power and initial threshold are applied and stored, state machine 200a may proceed to state 208.

Figure 3:
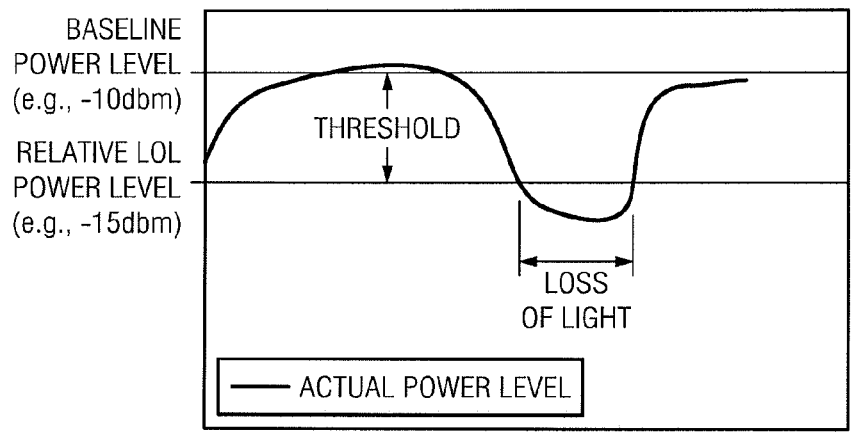
FIG. 3 illustrates an example graph of intensity of a light signal associated with a particular channel as detected by a photodetector, demonstrating an application of a baseline power level and a threshold established by the state machine depicted in FIG. 2A, in accordance with certain embodiments of the present disclosure.

At step 208, decision module 88, another component of OUPSR device 80, or any other suitable component of optical network 10 may maintain the initial baseline power level and/or initial threshold until the clean condition ceases to exist (in which case state machine 200a may proceed again to step 202) and/or OUPSR is deprovisioned for the particular channel (in which case state machine 200a may cease). FIG. 3 illustrates an example graph of intensity of a light signal associated with a particular channel as detected by a photodetector 86, demonstrating an application of a baseline power level and a threshold established by state machine 200a depicted in FIG. 2A, in accordance with certain embodiments of the present disclosure. For the purposes of exposition of FIG. 3, it is assumed that the initial baseline power level is established at a value of −10 dBm and the initial threshold is −5 dBm. While OUPSR is provisioned, a photodetector 86 (e.g., photodetector 86a) may monitor the intensity of light received via a path 42 (e.g., path 42a). If, at any time while OUPSR is provisioned, the intensity of light received by the photodetector 86 has decreased below the baseline power level by more than the threshold, decision module 88 (or another component of OUPSR device 80) may cause a protection switch on switch 84. The power level at which the protection switch may occur may be considered a relative loss of light (LOL) power level, wherein such relative LOL power level may be greater than the amount of noise expected to be detected at the photodetector 86, but still low enough relative to the baseline power level to indicate that a protection switch is appropriate. Thus, a loss of light condition and an accompanying protection switch may be triggered when an actual detected power level has decreased below the relative LOL power level, rather than being triggered as a result of absolute loss of light, allowing for effective operation in noisy conditions.

Figure 2B:
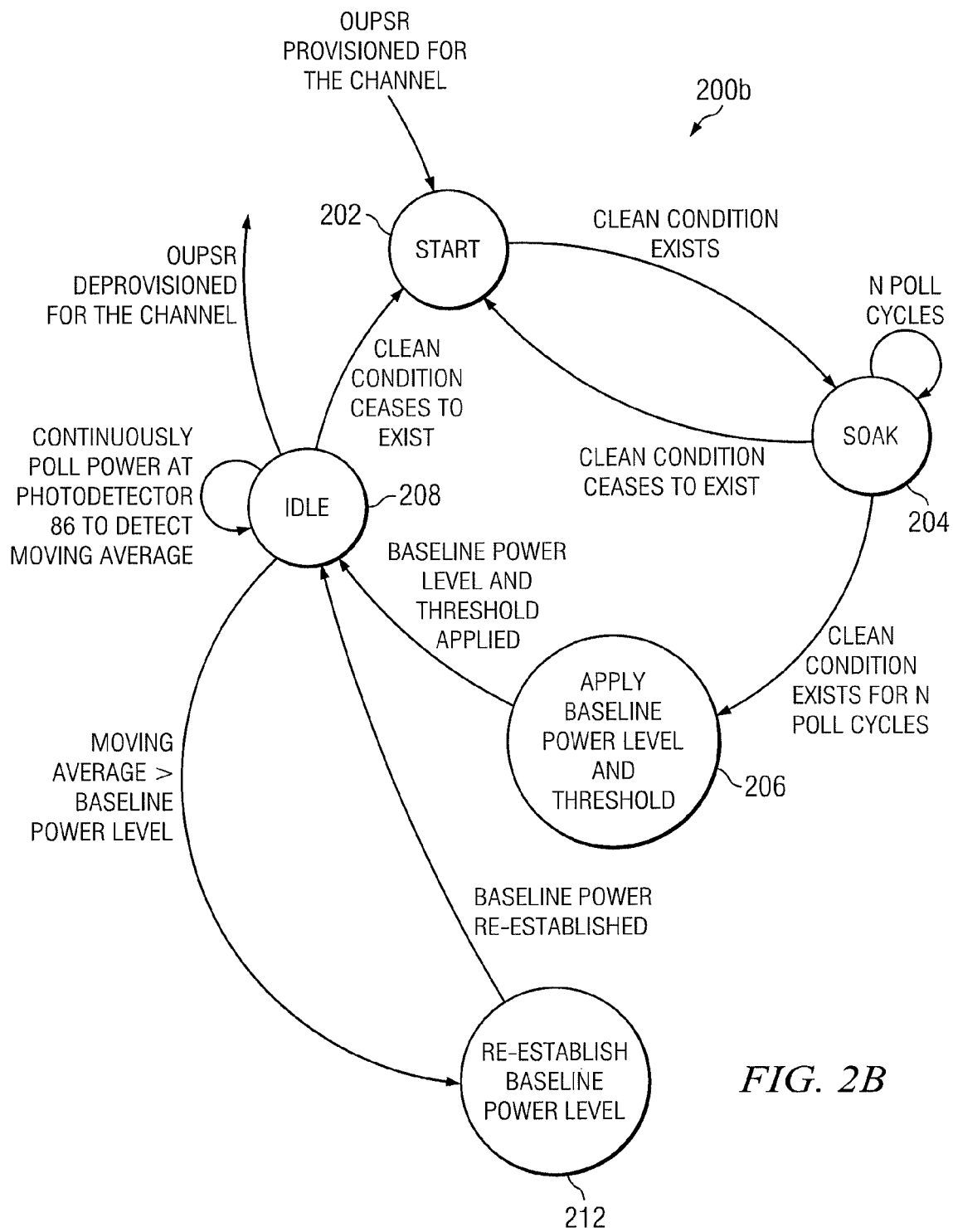

FIG. 2B is a flow chart illustrating a finite state machine 200b in accordance with certain embodiments of the present disclosure. State machine 200b may be maintained by decision module 88, another component of OUPSR device 80, or any other suitable component of optical network 10. As shown in FIG. 2B, states 202, 204, and 206 of state machine 200b may be similar or identical to states 202, 204, and 206 of state machine 200a depicted in FIG. 2A. In addition, state 208 of state machine 200b may be similar to state 208 of state machine 200a, except that when state machine 200b reaches state 208, decision module 88, another component of OUPSR device 80, or any other suitable component of optical network 10 may continuously monitor power at a photodetector 86 (e.g., photodetector 86) to detect an average power intensity for each particular channel of interest. Such average power level may be calculated using any suitable number of previously detected power levels for a particular channel. For example, the average power level may be a moving average power level based on a predetermined number of recent detected power levels (e.g., the five most recent detected power levels for the particular channel). If the average power level is greater than the then-present baseline power level, state machine 200b may proceed to step 212.

At state 212, decision module 88, another component of OUPSR device 80, or any other suitable component of optical network 10 may modify the baseline power level based on the detected average power level (e.g., may re-establish the baseline power level to be approximately equal to the detected average power level). After the baseline power level has been modified, state machine 202b may proceed again to state 208.

Figure 4:
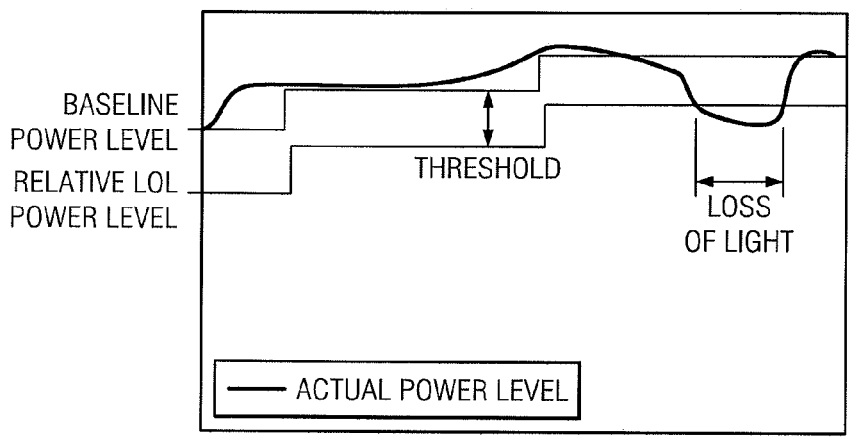
FIG. 4 illustrates an example graph of intensity of a light signal associated with a particular channel as detected by a photodetector, demonstrating an application of a baseline power level and a threshold established by the state machine depicted in FIG. 2B, in accordance with certain embodiments of the present disclosure.

FIG. 4 illustrates an example graph of intensity of a light signal associated with a particular channel as detected by a photodetector 86, demonstrating an application of a baseline power level and a threshold established by state machine 200b depicted in FIG. 2B, in accordance with certain embodiments of the present disclosure. As shown in FIG. 4, the intensity of light received by a photodetector 86 (e.g., photodetector 86a) on a particular channel may increase after OUPSR has been provisioned for numerous reasons (e.g., an increase in noise taking place after optical network 10 has been set up and OUPSR has been provisioned). Accordingly, the baseline power level established in accordance with state machine 200b may also increase over time to account for the increase in detected light intensity. Because the established threshold is not varied in accordance with state machine 200b, the relative LOL level will also increase each time the baseline power level is increased, such that the difference between the relative LOL level and the baseline power level is always approximately equal to the value of the established threshold. In accordance with state machine 200b, if, at any time while OUPSR is provisioned, the intensity of light received by the photodetector 86 has decreased below the dynamically changing baseline power level by more than the threshold (e.g., below the dynamically changing relative LOL level), decision module 88 (or another component of OUPSR device 80) may cause a protection switch on switch 84. Thus, a method in accordance with state machine 200b allows for variance in established baseline and relative LOL levels to account for when increased noise is coupled into optical network 10.

Figure 2C:
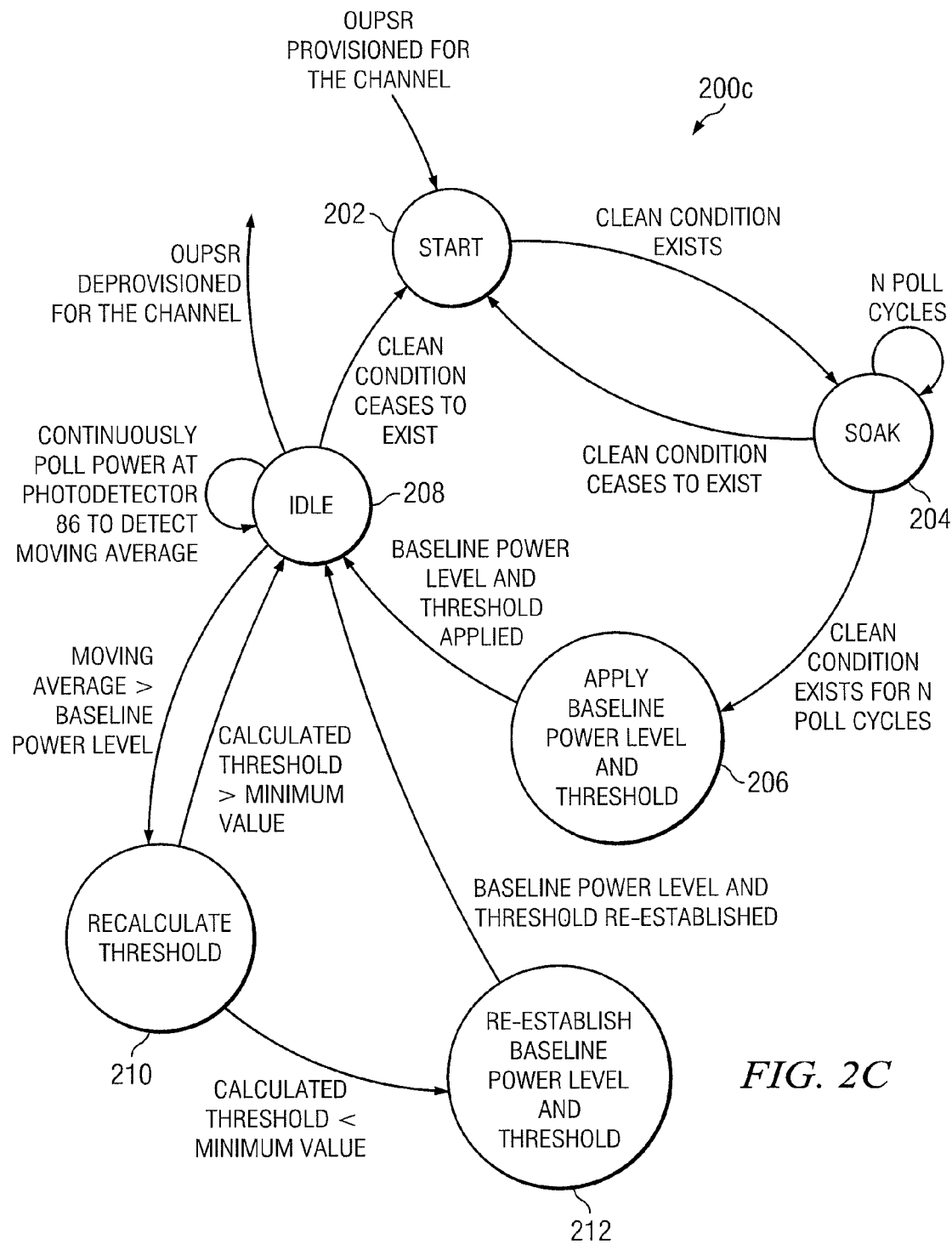

FIG. 2C is a flow chart illustrating a finite state machine 200c in accordance with certain embodiments of the present disclosure. State machine 200c may be maintained by decision module 88, another component of OUPSR device 80, or any other suitable component of optical network 10. As shown in FIG. 2C, states 202, 204, and 206 of state machine 200c may be similar or identical to states 202, 204, and 206 of state machine 200a depicted in FIG. 2A and/or states 202, 204, and 206 of state machine 200b depicted in FIG. 2B. In addition, state 208 of state machine 200c may be similar to state 208 of state machine 200a and/or state 208 of state machine 200b, except that when state machine 200c reaches state 208, decision module 88, another component of OUPSR device 80, or any other suitable component of optical network 10 may continuously monitor power at a photodetector 86 (e.g., photodetector 86) to detect an average power intensity for each particular channel of interest. Such average power level may be calculated using any suitable number of previously detected power levels for a particular channel. For example, the average power level may be a moving average power level based on a predetermined number of recent detected power levels (e.g., the five most recent detected power levels for the particular channel). If the average power level is greater than the then-present baseline power level, state machine 200c may proceed to step 210.

At state 210, decision module 88, another component of OUPSR device 80, or any other suitable component of optical network 10 may modify the threshold based on the detected average power level. For example, the new threshold value may be increased by an amount approximately equal to the difference between the average power level and the then-present baseline power level, such that:

New threshold value=Present Baseline Power Level−Average Power Level+Present Threshold Value To ensure that a suitable difference exists between the threshold value and the baseline power level, the calculated new threshold value may be compared to a predetermined minimum value. In some embodiments, the predetermined minimum value may be zero, to ensure that that threshold is not negative. If it is determined that the calculated new threshold value is greater than the predetermined minimum value, the threshold may be re-established with the calculated new threshold value, and state machine 200c may proceed again to state 208. If it is determined that the calculated new threshold value is not greater than the predetermined minimum value, state machine 200c may proceed to state 212, where the baseline power level and threshold may be modified as described below.

State 212 of state machine 200c may be similar to state 212 of state machine 200b, except that, in addition to modifying the baseline power level based on the detected average power level, decision module 88, another component of OUPSR device 80, or any other suitable component of optical network 10 may also modify the threshold value. For example, at state 212, decision module 88, another component of OUPSR device 80, or any other suitable component of optical network 10 may modify the baseline power level based on the detected average power level (e.g., may re-establish the baseline power level to be approximately equal to the detected average power level) and also modify the threshold such that it is approximately equal to the initial threshold established at step 206. After the baseline power level and the threshold have been modified, state machine 202c may proceed again to state 208.

Figure 5:
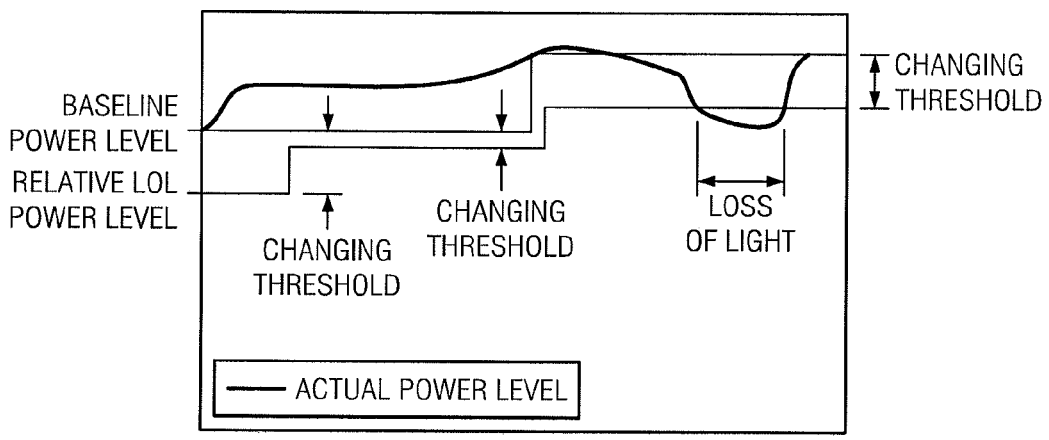
FIG. 5 illustrates an example graph of intensity of a light signal associated with a particular channel as detected by a photodetector, demonstrating an application of a baseline power level and a threshold established by the state machine depicted in FIG. 2C, in accordance with certain embodiments of the present disclosure.

FIG. 5 illustrates an example graph of intensity of a light signal associated with a particular channel as detected by a photodetector 86, demonstrating an application of a baseline power level and a threshold established by state machine 200c depicted in FIG. 2C, in accordance with certain embodiments of the present disclosure. As shown in FIG. 5, the intensity of light received by a photodetector 86 (e.g., photodetector 86a) on a particular channel may increase after OUPSR has been provisioned for numerous reasons (e.g., an increase in noise taking place after optical network 10 has been set up and OUPSR has been provisioned). Accordingly, the threshold established in accordance with state machine 200c may also decrease over time to account for the increase in detected light intensity. In addition, if an increase in the detected light intensity would otherwise cause a decrease of the threshold below a predetermined minimum value (e.g., zero), the baseline power level established in accordance with state machine 200c may also increase to account for the increase in detected light intensity, and the associated threshold may be re-established to approximately its initial value to account for the changing in the baseline power level. Accordingly, due to the varying threshold and baseline power level, the relative LOL level will also increase as the detected power level increases. In accordance with state machine 200c, if, at any time while OUPSR is provisioned, the intensity of light received by the photodetector 86 has decreased below the dynamically changing relative LOL level, decision module 88 (or another component of OUPSR device 80) may cause a protection switch on switch 84. Thus, a method in accordance with state machine 200c allows for variance in established baseline, threshold, and relative LOL levels to account for when increased noise is coupled into optical network 10. In addition, the method of state machine 200c may, as compared with state machine 200b, reduce the frequency at which the baseline power level is re-established, which may improve performance over the method of state machine 200b.

A component of optical network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to optical network 10 without departing from the scope of the invention. The components of optical network 10 may be integrated or separated. Moreover, the operations of optical network 10 may be performed by more, fewer, or other components. Additionally, operations of optical network 10 may be performed using any suitable logic. As used in this document, "each" refers to each member of a set or each member of a subset of a set.

Although the present invention has been described with several embodiments, various changes and modifications may be suggested to one skilled in the art. It is intended that the present invention encompass such changes and modifications as fall within the scope of the appended claims.

What is claimed is:

1. A method for protection switching in an optical network, comprising:
    establishing a baseline power level for a channel;
    receiving a signal associated with the channel via each of a first path of the optical network and a second path of the optical network;
    monitoring a power intensity of the signal received via the first path; and
    protection switching from the signal received via the first path to the signal received via the second path in response to a determination that the baseline power level exceeds the power intensity of the signal received via the first path by a predetermined threshold.

2. A method according to claim 1, wherein establishing the baseline power level for the channel includes:
    measuring the power intensity of the channel during a calibration phase; and
    setting the baseline power level based on the power intensity of the channel during the calibration phase.

3. A method according to claim 1, wherein establishing the baseline power level for the channel is in response to provisioning of an optical unidirectional path switched ring (OUPSR) in the optical network.

4. A method according to claim 1, wherein a relative loss of light value approximately equal to the baseline power level minus the predetermined threshold exceeds a power intensity of noise in the first path.

5. A system for protection switching in an optical network, comprising:
    a switch communicatively coupled to a receiver and communicatively coupled to a first path and a second path in an optical network, the switch configured to pass, for each of one or more channels, a signal associated with the channel from one of the first path and the second path; and
    a selector communicatively coupled to the switch and communicatively coupled to the first path and the second path, the selector configured to, for each of the one or more channels:
        receive a signal associated with the channel via a first path of the plurality of paths;
        monitor a power intensity of the signal received via the first path;
        in response to a determination that a baseline power level associated with the channel does not exceed the power intensity of the signal received via the first path by a predetermined threshold, communicate a first control signal to the switch such that the switch passes the signal associated with the channel from the first path; and
        in response to a determination that a baseline power level associated with the channel exceeds the power intensity of the signal received via the first path by a predetermined threshold, communicate a second control signal to the switch such that the switch passes the signal associated with the channel from the second path.

6. A system in accordance with claim 5, the selector further configured to establish the baseline power level by:
    measuring the power intensity of the channel during a calibration phase; and
    setting the baseline power level based on the power intensity of the channel during the calibration phase.

7. A system in accordance with claim 5, wherein at least one of the switch and the selector is a component of an optical unidirectional path switched ring (OUPSR) device.

8. A system according to claim 5, wherein a relative loss of light value approximately equal to the baseline power level minus the predetermined threshold exceeds a power intensity of noise in the first path.

9. A system according to claim 5, the selector including a photodetector configured to monitor the power intensity of the signal received via the first path.

10. A system according to claim 5, the selector including a decision module configured to:
    determine whether the baseline power level associated with the channel exceeds the power intensity of the signal received via the first path by the predetermined threshold; and
    communicate one of the first control signal and the second control signal to the switch based on the determination.

11. An optical network, comprising:
    a first communication path;
    a second communication path;
    a transmitter communicatively coupled to the first communication path and the second communication path and configured to transmit a signal via the first communication path and the second communication path;

a receiver communicatively coupled to the first communication path and the second communication path and configured to receive the signal via one of the first communication path and the second communication path a protection switching device coupled to the first communication path, the second communication path, and the receiver, and configured to:

receive the signal via the first communication path and the second communication path;

monitor a power intensity of the signal received via the first communication path;

in response to a determination that a baseline power level does not exceed the power intensity of the signal received via the first communication path by a predetermined threshold, pass the signal from the first path; and in response to a determination that a baseline power level exceeds the power intensity of the signal received via the first communication path by the predetermined threshold, pass the signal from the second path.

12. An optical network in accordance with claim 11, the protection switching device further configured to establish the baseline power level by:

measuring the power intensity during a calibration phase; and setting the baseline power level based on the power intensity during the calibration phase.

13. An optical network in accordance with claim 11, wherein the protection switching device comprises an optical unidirectional path switched ring (OUPSR) device.

14. An optical network in accordance with claim 11, wherein a relative loss of light value approximately equal to the baseline power level minus the predetermined threshold exceeds a power intensity of noise in the first communication path.

15. An optical network in accordance with claim 11, the protection switching device including a photodetector configured to monitor the power intensity of the signal received via the first communication path.

16. An optical network in accordance with claim 11, the protection switching device including a decision module configured to:

determine whether the baseline power level exceeds the power intensity of the signal received via the first path by the predetermined threshold; and communicate one of the first control signal and the second control signal to the switch based on the determination.

17. A system for protection switching in an optical network, comprising:

means for establishing a baseline power level for a channel;

means for receiving a signal associated with the channel via each of a first path of the optical network and a second path of the optical network;

means for monitoring a power intensity of the signal received via the first path;

means for protection switching from the signal received via the first path to the signal received via the second path in response to a determination that the baseline power level exceeds the power intensity of the signal received via the first path by a predetermined threshold.

18. A system according to claim 17, wherein the means for establishing the baseline power level for the channel includes:

means for measuring the power intensity of the channel during a calibration phase; and means for setting the baseline power level based on the power intensity of the channel during the calibration phase.

19. A system according to claim 17, wherein at least one of the establishing the baseline power level, means for receiving the signal, means for monitoring the power intensity, and means for protection switching is in response to provisioning of an optical unidirectional path switched ring (OUPSR) device.

20. A system according to claim 17, wherein a relative loss of light value approximately equal to the baseline power level minus the predetermined threshold exceeds a power intensity of noise in the first path.

* * * * *